G. C. BROWN.
TRANSMISSION BRAKE OPERATING MECHANISM.
APPLICATION FILED SEPT. 9, 1918.
1,383,385.
Patented July 5, 1921.
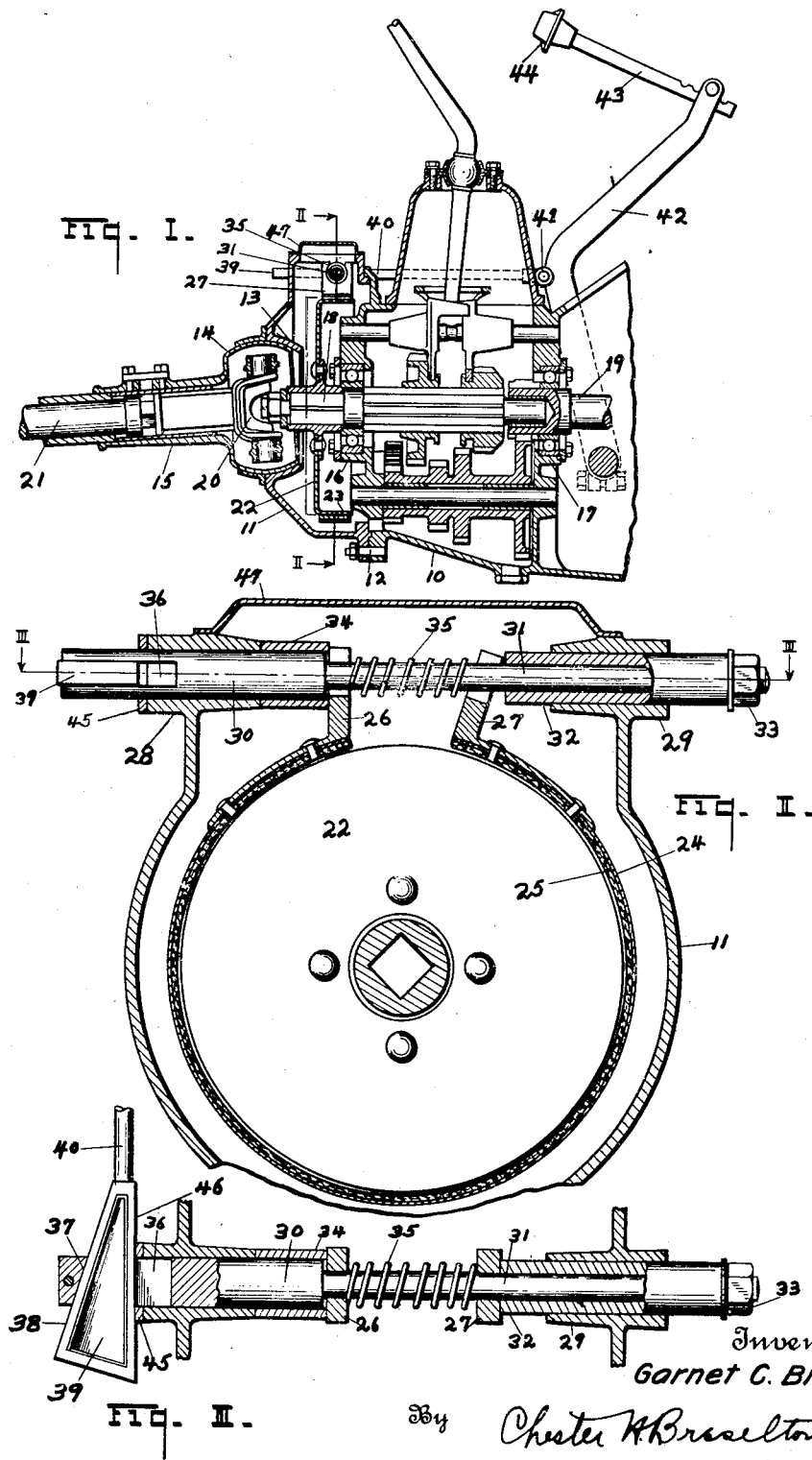
Inventor
Garnet C. Brown
By Chester H. Braselton
Attorney

UNITED STATES PATENT OFFICE.

GARNET C. BROWN, OF DAYTON, OHIO, ASSIGNOR TO THE WILLYS-OVERLAND COMPANY, OF TOLEDO, OHIO, A CORPORATION OF OHIO.

TRANSMISSION-BRAKE-OPERATING MECHANISM.

1,383,385. Specification of Letters Patent. Patented July 5, 1921.

Application filed September 9, 1918. Serial No. 253,239.

*To all whom it may concern:*

Be it known that I, GARNET C. BROWN, a citizen of the United States, residing at Dayton, county of Montgomery, and State of Ohio, have invented certain new and useful Improvements in Transmission-Brake-Operating Mechanism, of which I declare the following to be a full, clear, and exact description.

The present invention relates to an improved transmission brake operating mechanism and has for its object to provide an interchangeable brake operating device which can be readily disconnected and reversed so that the operating rod and associated parts may be extended from either side of the brake drum, whereby the same mechanism can be used on a power-driven vehicle provided with either a right or left hand drive. A further object of the invention is to provide in a transmission brake operating mechanism, means for adjusting the same exteriorly of the housing in which the mechanism is mounted.

A further object of the invention is to provide a brake operating mechanism having few parts of simple construction which may be manufactured at a relatively low cost.

Further objects, and objects relating to economies of manufacture and details of construction, will definitely appear from the detailed description to follow.

I accomplish the objects of my invention by the devices and means described in the following specifications. My invention is clearly defined and pointed out in the appended claims.

A structure constituting a preferred embodiment of my invention is illustrated in the accompanying drawings, forming a part of this specification, in which:

Figure I is a longitudinal sectional elevation of a power transmission showing the application of the invention thereto.

Fig. II is a detail sectional elevation of the transmission brake taken substantially on line II—II of Fig. I, and Fig. III is a horizontal section taken on line III—III of Fig. II.

In the drawings, similar reference numerals refer to similar parts throughout the several views and the sectional views are taken looking in the direction of the little arrows at the ends of the section lines.

The present invention embodies an interchangeable brake operating mechanism for transmission brakes and is thus designed for the reason that in certain cases it is desirable to apply a brake of this kind to automobiles provided in some instances with a left hand drive and in others with a right hand drive. In making the change from one to the other of these types, or in assembling the parts in either case, the operation is very simple and requires little time, as will hereinafter appear.

Referring to the drawings, 10 represents a transmission housing or frame, upon the rear face of which is mounted the brake housing or casing 11 held in position by means of the bolts 12, as shown in Fig. I. The rear portion of the casing 11 is preferably made hemispherical in shape, as indicated at 13 to receive the correspondingly shaped end 14 of the short drive shaft casing 15.

Oppositely positioned bearings 16 and 17 are provided upon the casing 10 for the transmission drive shaft 18, which is suitably connected with the forward drive shaft 19 and with the universal joint 20, the latter being housed by the casing 14 and connected with the propeller shaft 21 by a slip joint, as clearly indicated in Fig. I.

The transmission gearing and shifting mechanism therefore may be of any desired construction but is preferably of the type shown in Fig. I, the various parts of which need not be described in detail.

A brake member or drum 22 is rigidly connected with the drive shaft 18 and is provided with a laterally extending flange 23 adapted to receive the gripping element comprising the brake band 24 having the lining 25 and provided with the outwardly extending projections or forked members 26 and 27, shown in section in Fig. II.

At points opposite the forks 26 and 27, the housing or support 11 is provided with the guides 28 and 29, each of which is preferably in the form of a boss extending inwardly and outwardly of the housing and both having the same proportions as regards to length and size.

Extending through the guide 28 is a plunger 30 having the stem 31, the outer end of which is mounted in the sleeve 32 carried by the guide 29 and held against outward movement by the nut 33, which is adjustable upon the threaded end of the stem, exteriorly of the transmission housing.

Mounted upon the plunger 30 between the guide 28 and fork 26 is a thimble or spacing member 34. A spring 35 upon the stem of the plunger engages the inner faces of the forks 26 and 27 and serves to normally hold the brake band in release position upon the drum, the outer faces of the forks being engaged, one by the sleeve 32 and the other by the thimble 34, as shown in Fig. II.

A slot 36 is formed in the plunger at the larger end thereof and is provided with an inclined or beveled edge 37 adapted to cooperate with the inclined surface 38 of the wedge block 39 when the same is actuated by the rod 40 pivoted at 41 upon the bent lever 42, the latter carrying the adjustable stem 43 adapted to extend through the dash board (not shown) and having the pedal 44 in position to be actuated by the foot of the driver.

The wearing faces of the wedge block are preferably hardened and likewise the beveled edge 37 of the stem 30, as well as the washer 45 interposed between the outer end of the guide 28 and the inner face 46 of the wedge.

One of the important features of the present invention comprises the means exteriorly of the housing for adjusting the brake band relatively to the drum without having to remove the housing cover 47, this adjustment being effected simply by tightening the nut 33 on the small end of the plunger.

In the drawings, the plunger 30 and operating parts are shown connected up for a car having a left hand drive. In changing from the left to the right hand position, the rod 40 may be disconnected at 41 from the lever 42 and the nut 33 removed from the stem, after which the plunger 30 is withdrawn and reversed, with the sleeve 32 inserted in the guide 28 and the thimble 34 placed between the fork 27 and the guide 29, the spring being slipped on the stem to engage the forks, as shown. The nut 33 is then screwed upon the stem until the forks are brought to the desired position of adjustment, so that the lining of the brake band will clear the drum, as shown in Fig. II. The rod 40 is then connected with the operating lever and the brake is ready for service.

In the operation of my improved brake mechanism, when pressure is applied to the pedal 44, the lever 42 will move the rod 40 and wedge 39 so that the inclined face 38 of the latter will travel upon the beveled edge 37 of the plunger and force the same to the left of the position shown in Fig. III, thereby actuating the sleeve 32 to move the fork 27 against the resistance of the spring 35 until the drum is gripped by the brake band. As soon as the driver releases the pedal, the spring will return the parts to normal position, as shown in Figs. II and III.

I am aware that the particular embodiment of my invention, which I have here shown and described, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:—

1. In a brake operating mechanism, the combination of a support, a brake member, a gripping element for said brake member, and means reversible upon the support for effecting operation of the gripping member in opposite directions.

2. In a brake operating mechanism, the combination of a drive shaft, a brake member connected with the shaft, a gripping element for said brake member, a support, and means reversible upon the support for effecting operation of the gripping element from opposite sides thereof.

3. In a brake operating mechanism, the combination of a support, oppositely positioned guides upon the support, a drive shaft, a brake member for said drive shaft, a gripping element for said brake member, a plunger reversible upon said guides for effecting the operation of the gripping member from opposite sides thereof, and means for actuating said plunger.

4. In a brake operating mechanism, the combination of a housing, a brake drum therein, a gripping element for the drum, and means reversible upon the housing for effecting operation of the gripping member from opposite sides thereof.

5. In a brake operating machanism, the combination of a support, oppositely positioned guides upon said support, a drive shaft, a brake member for said shaft, a gripping element for said brake member provided with spaced projections, a plunger upon said guides, a removable member upon the plunger interposed between one of said projections and one of said guides, a second removable member upon the plunger seated upon the opposite guide engaging the other of said projections and adapted to actuate the same, means for actuating said plunger, and means for returning the same to normal position.

6. In a brake operating mechanism, the combination of a housing, a brake drum therein, a gripping element for the drum, alined guides upon the housing, a plunger extending through the guides for operating said gripping element, and being reversible upon said guides for effecting the operation of the gripping element from opposite sides thereof, means upon the plunger exteriorly of the housing for adjusting the gripping element relatively to said drum, and means for actuating said plunger.

7. In a brake operating mechanism, the combination of a housing, a brake drum therein, a gripping element for the drum, alined guides upon the housing, a plunger slidable in said guides and adapted to actuate said gripping element, and being reversible upon said guides for effecting the operation of the gripping element from opposite sides thereof, means exteriorly of the housing for adjusting said gripping element relatively to the drum, and means for actuating the plunger.

8. In a brake operating mechanism, the combination of a support, oppositely positioned guides upon the support, a drive shaft, a brake member for said shaft, a gripping element for said brake drum, a plunger reversible upon said guides for effecting operation of the gripping member from opposite sides thereof, an inclined member slidably mounted upon said plunger for actuating the same, and means for moving said inclined member.

9. In a brake operating mechanism, the combination of a brake drum, a pair of spaced guides, a plunger reciprocally mounted upon the guides, a gripping element for the drum provided with laterally disposed projections through which the plunger extends, a spring upon the plunger between said projections, means for holding one of the projections, and means for actuating the plunger to move the other projection, said plunger being reversible upon said guides for effecting the operation of the gripping element from opposite sides thereof.

10. In a brake operating mechanism, the combination of a brake drum, a gripping element for the drum provided with spaced laterally extending projections, a reversible plunger extending through said projections, a spring upon the plunger between said projections, guides spaced from the projections on opposite sides thereof adapted to support said plunger, means abutting one of the guides for preventing movement of one of said projections, means adapted to be actuated by the plunger for moving the other of said projections, and means for actuating the plunger.

11. In a brake operating mechanism the combination of a brake drum, a pair of spaced guides, a reversible plunger reciprocally mounted upon the guides, a resilient gripping element for the drum provided with spaced laterally disposed projections through which the plunger extends, a spring upon the plunger between said projections, a removable spacing member upon the plunger between one of said guides and the projection nearest thereto, and means for actuating said plunger.

12. In a brake operating mechanism, the combination of a brake drum, a pair of spaced guides, a plunger provided with a reduced portion, a gripping element for the drum provided with spaced laterally disposed projections through which said reduced portion extends, a spring upon said reduced portion between said projections, a removable sleeve upon said reduced portion within one of said guides and engaging the projection nearest thereto, means for adjusting said sleeve upon said reduced portion of the stem, a removable spacing member upon the plunger engaging the opposite projection and abutting the other of said guides, and means for actuating said plunger.

13. In a brake operating mechanism, the combination of a support, a brake member, a gripping element for said brake member, means reversible upon the support adapted to actuate said gripping member in opposite directions, and a wedge operatively connected with said last mentioned means for actuating the same.

14. In a brake operating mechanism, the combination of a support, oppositely positioned guides upon the support, a drive shaft, a brake member upon said drive shaft, a gripping element for said brake member, a plunger slidable upon said guides and operatively connected with said gripping member, and a wedge interposed between said support and one end of said plunger for actuating the latter.

15. In a brake operating mechanism, the combination of a housing, a brake drum therein, a gripping element for the drum, alined guides upon the housing, a plunger slidable upon the guides and operatively connected with said gripping element, and a wedge interposed between one of said guides and said plunger to effect movement of the latter when said wedge is actuated.

In testimony whereof, I affix my signature.

GARNET C. BROWN.